Nov. 26, 1968 F. X. DOWNEY 3,413,555

ANALOG DATA CONVERTER FOR A PHASE COMPARISON TELEMETRY SYSTEM

Filed July 19, 1965 2 Sheets-Sheet 1

INVENTOR
FRANCIS X. DOWNEY

BY James G. Murray
R. S. Sciascia ATTORNEYS

Nov. 26, 1968 F. X. DOWNEY 3,413,555
ANALOG DATA CONVERTER FOR A PHASE COMPARISON TELEMETRY SYSTEM
Filed July 19, 1965 2 Sheets-Sheet 2

INVENTOR
FRANCIS X. DOWNEY

BY James G. Murray
ATTORNEYS

United States Patent Office 3,413,555
Patented Nov. 26, 1968

3,413,555
ANALOG DATA CONVERTER FOR A PHASE COMPARISON TELEMETRY SYSTEM

Francis X. Downey, Annandale, Va., assignor to the United States of America as represented by the Secretary of the Navy Filed July 19, 1965, Ser. No. 473,251
2 Claims. (Cl. 325—163)

ABSTRACT OF THE DISCLOSURE

A signal converter for converting DC or AC signals into signals which are phase modulated and synchronized to a standard reference tone. A reference signal and a data signal are coupled to a comparator which produces a sharp pulse when the potential of the data signal and of the reference signal are related in a predetermined way. The output of the comparator is multiplied in frequency and is then heterodyned in a mixer with a signal from a local oscillator which is phase locked to the reference signal.

Figure 1:
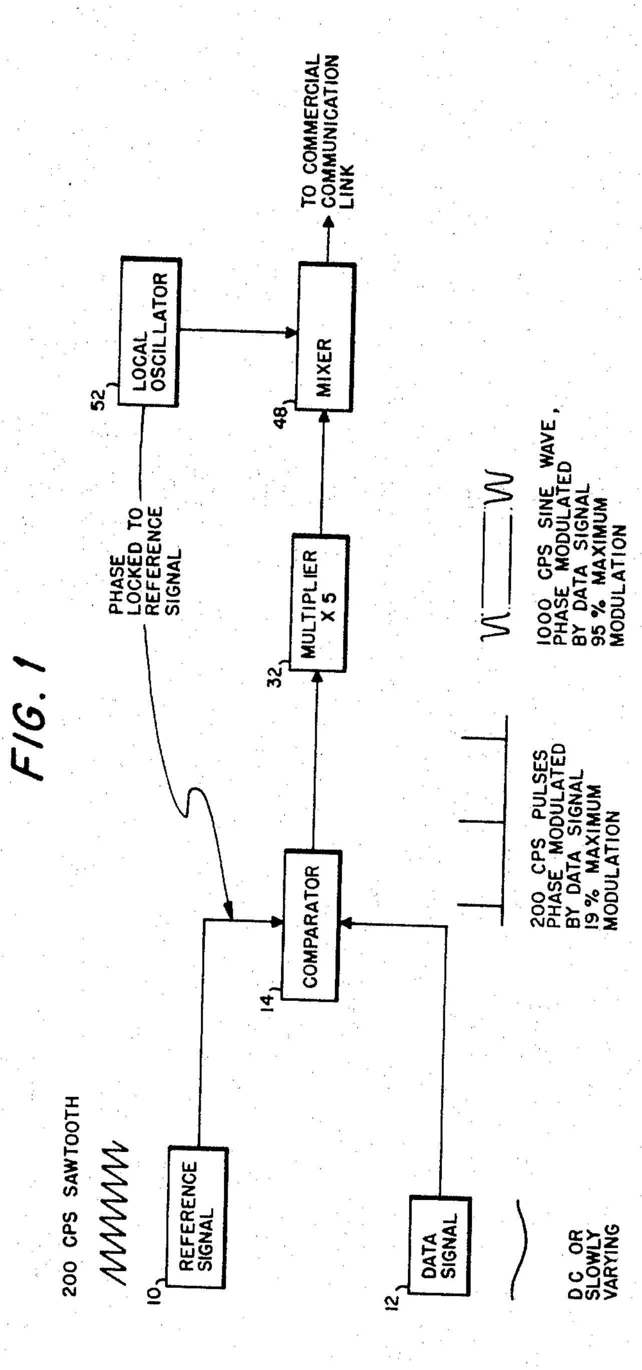

The invention described herein may be manufactured and used by or for the Government of the United States of America for governmental purposes without the payment of any royalties thereon or therefor.

This invention relates to signal converters in general and in particular to an analog data converter which is suitable for use in a phase comparison telemetary system.

Patent application Ser. No. 265,295, filed Mar. 14, 1963 by Roger L. Easton, Francis X. Downey and Charles H. Weaver, now Patent No. 3,290,440, disclosed an information transmission system wherein data is transmitted over commercial communication links. This previously disclosed system requires information or input signals which are phase modualted and synchronized to a standard reference signal or tone.

The general purpose of the present invention is to provide a signal converter for converting DC or AC signals, which are of course representative of other parameters, into signals which are phase modulated and synchronized to a standard reference tone and are therefore suitable for use as the input signals to data transmission systems such as described in the previously mentioned patent application.

It is, therefore, an object of the present invention to provide a signal converter which is suitable for use with a telemetry system.

A further object of the invention is the provision of a signal converter for converting DC or AC signals into signals which are suitable for use with a telemetry system.

Yet another object of the present invention is the provision of a signal converter for converting DC or AC signals into signals which are phase modulated and synchronized to a standard reference signal.

A still further object is to provide a signal converter for converting DC or AC signals, which are representative of other parameters, into signals which are phase modulated and synchronized to a standard reference tone and are suitable for use with a telemetry system.

Figure 2:
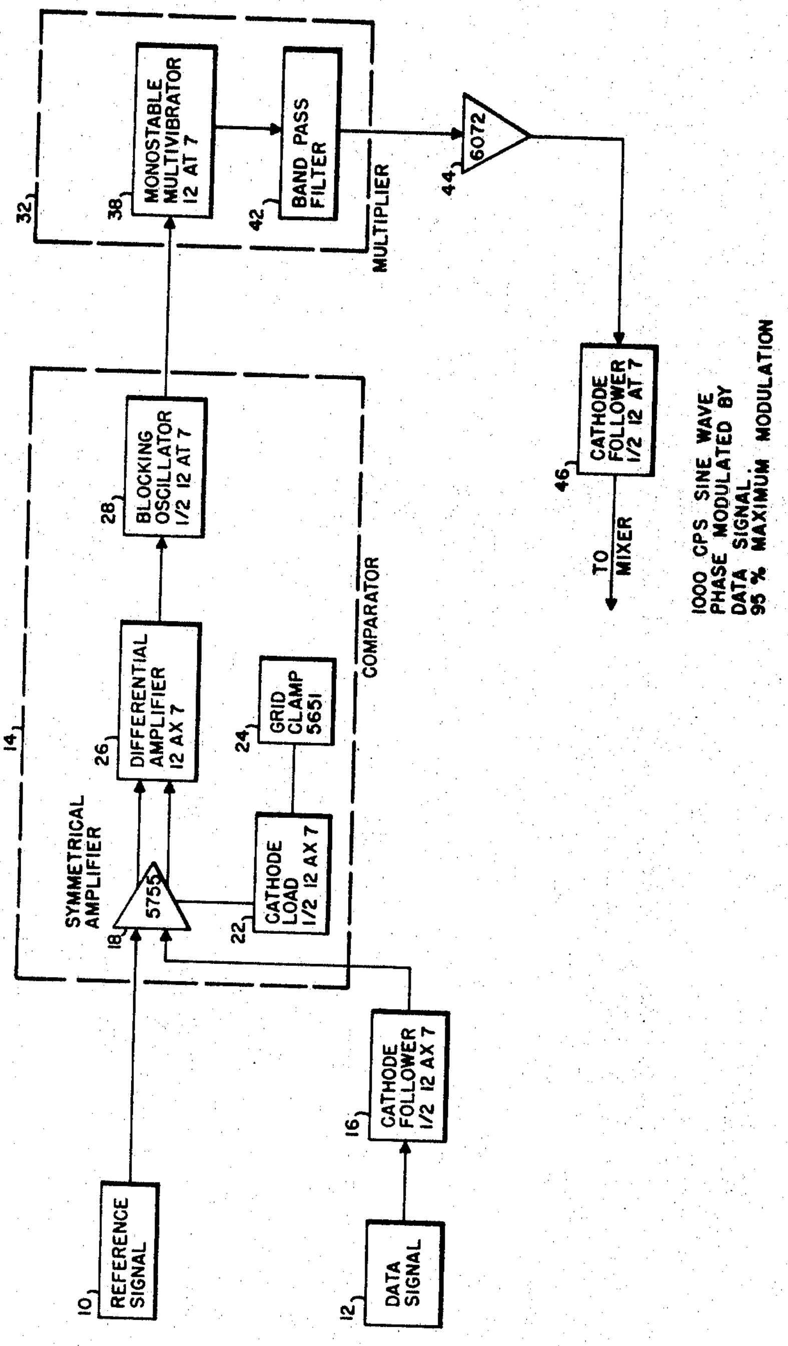

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a block diagram of the invention and also shows waveforms that exist at strategic locations in the invention and FIG. 2 is a more detailed illustration of certain portions of the invention.

Referring now to the drawings, the reference numeral 10 identifies a reference signal source. Typically this signal source may be a 200 c.p.s. sawtooth generator which is synchronized to a master clock or oscillator which may also serve, in a well known way, as the reference for a large and complex system which is not part of the present invention. It will also be recognized that the waveform of source 10 may be other than a sawtooth, for instance a sine wave, in which case the data signal to be transmitted will be converted to a phase modulated signal wherein the phase modulation relationship is trigonometric in nature.

Reference numeral 12 identifies the source of the data signal which it is desired to transmit. Typically this signal will be representative of some measured parameter or other data and may be either DC or AC in form. It will be evident to skilled persons that if the signal 12 is AC in form, the frequency must be appreciably lower than the frequency of the reference signal source 10.

Both the reference and the data signals are applied to the comparator 14. In some instances it may be desirable, as for purposes of correctly loading the data signal generator, to couple the data signal to the comparator through a cathode follower 16, as is shown in FIG. 2. Typically the cathode follower 16 could include one half of a 12AX7 tube. The function of the comparator 14 is to produce a sharp pulse when the potential of the reference signal and the potential of the data signal are related in a certain way; typically when these signals are equal. While many circuits are known which are suitable for use as the comparator 14, the comparator may take the form shown in FIG. 2 wherein a symmetrical triode tube, such as a 5755 tube, is connected to equally, or by fixed ratio, amplify both the reference and data signals. For stability purposes, the cathodes of the 5755 tube may be loaded by a cathode load 22, such as one half of a 12AX7 tube, which is in turn stabilized by a grid clamp 24, such as a 5651 voltage reference tube. The outputs of the symmetrical amplifier are connected to a conventional differential amplifier 26, which may include a 12AX7 tube connected so that one side of the tube serves as a cathode follower to correctly load the data signal portion of tube 18 and the other half conducts (and strongly amplifies the difference of the reference and data signal potentials) whenever the reference signal exceeds the data signal. The output of amplifier 26 is connected to blocking oscillator 28 which includes one half of a 12AT7 tube and functions to generate a sharp pulse upon being energized by amplifier 26. The coupling of amplifier 26 and oscillator 28 may conventionally include cathode follower and differentiating circuits which are not shown in FIG. 2.

It will be now recognized that the output of comparator 14 consists of a series of pulses at the reference signal frequency of 200 c.p.s. and that this pulse train is phase modulated by the amplitude of the data signal. It has been found desirable, because of linearity, ambiguity and other considerations, to limit the maximum phase modulation of the comparator 14 to 19% or 68.4 electrical degrees.

Comparator 14 is connected to frequency multiplier 32 which functions by a technique well known in the telemetry art to convert the 200 c.p.s. pulse train output of comparator 14 to a 1000 c.p.s. sine wave. The frequency multiplication factor of 5 is also effective as to the extent of the phase modulation, i.e., the phase modulation of 19% at the output of the comparator 14 is changed by multiplier 32 to a modulation of 95% or 342 electrical degrees.

As shown in FIG. 2, the multiplier 32 includes the serially connected monostable, or one shot, multivibrator 38 which includes a 12AT7 tube and a filter 42 having a pass band centered at 1000 c.p.s. The multivibrator 32 is designed, according to well known wave and design theory, so that the pulse duration enhances the fifth harmonic or 1000 c.p.s. component. This 1000 c.p.s. component is further accentuated by the filter 42 which severely attenuates all other harmonic components.

The output signal of filter 42 may, if desired, be passed through an amplifying stage 44, typically including a 6072 tube and, for isolation and impedance matching purposes, through a cathode follower stage 46 which may include one half of a 12AT7 tube.

At this point the data signal will have been changed from a DC or slowly varying AC signal to a 1000 c.p.s. sinusoidal signal which is phase modulated with respect to the reference signal 10. To be used with commercial communication links and in signal transmission systems such as are described in the aforementioned patent application Ser. No. 265,295, the signal must be heterodyned in the mixer 48 with the carrier signal from the local oscillator 52. To preserve the phase modulation relationship with respect to the reference signal 10, it is of course necessary that the oscillator 52 be phase locked to the reference signal 10.

It will by now be recognized that there has been disclosed an electronic circuit for converting DC or AC signals, which may be representative of other parameters, into signals which are phase modulated and synchronized to a standard reference tone and are suitable for use as the input signals to data transmission systems which utilize commercial communication links.

It should also be understood that the numerical values and specific structure described above are representative and not limiting. Obviously many modifications and variations of the present invention are possible in the light of the above teachings. It is therefore to be understood that, within the scope of the appended claims, the invention may be practiced otherwise than as specifically described.

I claim:

1. An electronic signal conversion system comprising:
a data signal source;
a reference signal source of a frequency substantially higher than the frequency of said data signal;
differential amplifier means connected to receive said data signal and said reference signal for producing an output signal whenever said reference signal is larger than said data signal;
multiplier means connected to said differential amplifier means to increase the frequency of said differential amplifier means output signal to a predetermined frequency which is substantially higher than the frequency of said reference signal, said multiplier means comprising a monostable multivibrator coupled to said differential amplifier means and a filter connected to said monostable multivibrator and having a pass band centered at said predetermined frequency;
a local oscillator phase locked to said reference signal; and
a mixer connected to said local oscillator and to said multiplier means.

2. An electronic signal conversion system comprising:
a data signal source;
a reference signal source of a frequency substantially higher than the frequency of said data signal;
differential amplifier means connected to receive said data signal and said reference signal for producing an output signal whenever said reference signal is larger than said data signal;
multiplier means connected to said differential amplifier means to increase the frequency of said differential amplifier means output signal to a predetermined frequency which is substantially higher than the frequency of said reference signal;
a symmetrical amplifier coupled between said reference signal source and said differential amplifier means;
a blocking oscillator coupled between said differential amplifier and said multiplier means;
a local oscillator; and
a mixer connected to said local oscillator and to said multiplier means.

References Cited

UNITED STATES PATENTS

| | | | |
|---|---|---|---|
| 2,566,826 | 9/1951 | Day | 332—9 |
| 2,892,940 | 6/1959 | Ogletree | 328—146 |
| 3,045,071 | 7/1962 | Matthews et al. | |
| 3,162,857 | 12/1964 | Sanders | 325—143 X |
| 3,246,260 | 4/1966 | Clayton | 325—143 X |
| 3,304,439 | 2/1967 | Stratton et al. | 328—38 X |

ROBERT L. GRIFFIN, *Primary Examiner.*

J. T. STRATMAN, *Assistant Examiner.*